United States Patent [19]

Robinson, Jr. et al.

[11] Patent Number: 5,447,078
[45] Date of Patent: Sep. 5, 1995

[54] SUBMERSIBLE GEARMOTOR

[75] Inventors: James T. Robinson, Jr., Piedmont, S.C.; Timothy J. Hassett, Concord, Ohio; Gary L. Wheeler, Lyndhurst, Ohio; Mark M. Hodowanec, Mentor, Ohio

[73] Assignee: Reliance Electric Industrial Company, Greenville, S.C.

[21] Appl. No.: 123,724

[22] Filed: Sep. 17, 1993

[51] Int. Cl.⁶ ............................................. F16H 57/02
[52] U.S. Cl. .................. 74/606 R; 74/421 A; 310/83; 415/118
[58] Field of Search .............. 74/421 A, 606 R; 310/83, 87; 415/118, 168.2, 170.1, 122.1, 126.1, 56.2

[56] References Cited

U.S. PATENT DOCUMENTS

| | | | |
|---|---|---|---|
| 3,734,637 | 5/1973 | Beck | 415/122.1 |
| 4,840,535 | 6/1989 | Skarstad | 415/168.2 |
| 4,884,945 | 12/1989 | Boutin et al. | 415/171.1 |
| 5,173,019 | 12/1992 | Sdano | 415/118 |

OTHER PUBLICATIONS

"Framco Submersible Aerators" Brochure, Framco Aeration & Mixing Co., Sarasota, Fla., No. FRAM-SUB1290.
Framco Model 2460TA Submersible Aerator Specification, Framco Aeration & Mixing Co., Sarasota Fla.
Reliance Duty Master A-C Motors Brochure, Reliance Electric Company, Cleveland, Ohio, Bulletin B-25-50-7, No. 10825M.
Flygt Submersible Mixers Specifications & Applications, Flygt Corporation, Norwalk, Conn., Bulletin No. 88 MIX, Copyright 1988.

*Primary Examiner*—Allan D. Herrmann
*Assistant Examiner*—Peter Kwon
*Attorney, Agent, or Firm*—Dority & Manning

[57] ABSTRACT

A submersible gearmotor including a liquid resistant housing with radially inwardly extending partitions which form at least two shaft receiving chambers. The separate chambers act as protective regions between the internal components of the gearmotor and an outside liquid medium when submersed. The gearmotor also includes a tandem seal arrangement including an inboard seal located inside the housing and an outboard seal located outside the housing. The seals prevent the outside liquid medium from entering the gearmotor where the housing intersects with the rotating output shaft. The gearmotor further includes a leak detection system consisting of moisture sensing probes mounted inside one or both of the receiving chambers.

32 Claims, 3 Drawing Sheets

SUBMERSIBLE GEARMOTOR

BACKGROUND OF THE INVENTION

The present invention generally relates to gearmotors and more particularly to a submersible gearmotor or an apparatus incorporating a submersible gearmotor.

Gearmotors are motors combined with either a set of speed reducing gears (a reducer) or with a set of speed increasing gears (an increaser). Mechanical speed reducers are commonly used in conjunction with motors to provide for shaft speed reduction between the motor and an output device. Reducers also increase shaft torque by mechanically reducing the shaft speed of the prime mover. Increasers, on the other hand, increase the shaft speed of the prime mover.

Conventional gearmotor devices have been in use for many years in many different applications. Typically, gearmotors are designed with vented gear cases, and have other components not suitable for submersion in liquid environments. Consequently, a need exists for a unitized submersible device with reduced output speeds and increased torques or, alternatively, with increased output speeds. Also, a need exists for a submersible device with an improved sealing system for preventing water or other foreign matter from entering the device and damaging its components.

SUMMARY OF THE INVENTION

The present invention recognizes and addresses the foregoing disadvantages, and others of prior art constructions and methods.

Accordingly, it is an object of the present invention to provide a submersible gearmotor.

It is another object of the present invention to provide a liquid impervious sealing system for a submersible gearmotor.

It is another object of the present invention to provide a leak detection and seal failure warning system for a submersible gearmotor.

Another object of the present invention is to provide a submersible gearmotor that is protected from damage to its seals from stringy or fibrous materials.

Still another object of the present invention is to provide an improved submersible apparatus.

These and other objects of the present invention are achieved by providing a submersible gearmotor having a motor contained in a motor housing and including a motor shaft extending into a geartrain housing. The geartrain housing is integrally attached to the motor housing and contains at least one gear and a geartrain output shaft which extends to the exterior of the geartrain housing for operative connection to a device to be driven by the gearmotor. The geartrain housing further includes at least a first radially inwardly extending partition forming a first output receiving chamber containing a geartrain, and a second radially inwardly extending partition forming a second output shaft receiving chamber which is adjacent the portion of the geartrain housing to which the output shaft extends.

The submersible gearmotor includes an inner sealing means for sealing between the first inwardly extending partition and the output shaft and an outer sealing means for sealing between the second radially inwardly extending partition and the output shaft. The inner sealing means and the outer sealing means seal the gearmotor against entry of moisture or other foreign matter. Such sealing means could include mechanical face seals.

The submersible gearmotor can also include a means for sensing moisture in one or both of the output shaft receiving chambers and/or in the motor housing. A detection of moisture would indicate a leak in the housing and the need for preventive maintenance before the gearmotor is damaged. As used here, moisture refers to any conductive fluid such as, for example, water.

The submersible gearmotor as described herein can be incorporated into a variety of submersible apparatus. For example, the gearmotor could be operatively attached to an aerator, a pump or a mixer.

These and other objects are also accomplished by providing a submersible apparatus. The apparatus includes a gearmotor contained in a housing and including a motor, a motor shaft, a geartrain and a geartrain output shaft. The output shaft extends to the exterior of the housing and is operatively connected to a fluid propulsion device. The housing includes at least a first radially inwardly extending partition forming a first output shaft receiving chamber, and a second radially inwardly extending partition forming a second output shaft receiving chamber adjacent the portion of the housing through which the output shaft extends. The submersible apparatus further includes inner sealing means for sealing between the first inwardly extending partition and the output shaft and outer sealing means for sealing between the second radially inwardly extending partition and the output shaft, whereby the gearmotor is sealed against entry of moisture. The submersible apparatus further includes means for sensing moisture in the second receiving chamber, the first receiving chamber and/or in the motor housing so as to detect failure of the sealing means before the submersible apparatus is damaged.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
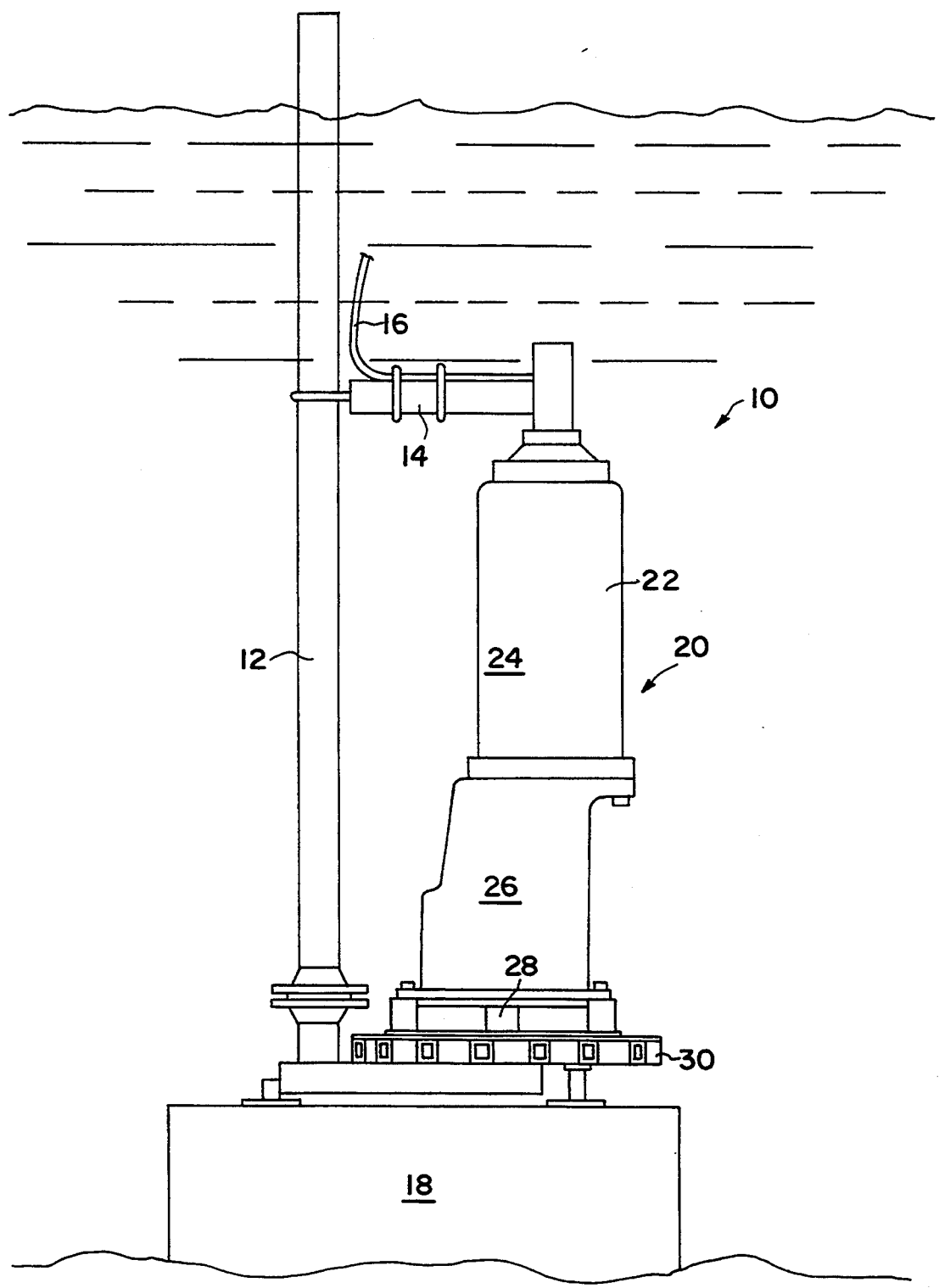
FIG. 1 is a side view of a submersible aerator incorporating an embodiment of the submersible gearmotor of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Referring to FIG. 1, a submersible aerator incorporating an embodiment of the submersible gearmotor of the present invention is illustrated generally as 10. In general, submersible aerator 10 includes an air intake pipe 12, a support assembly arm 14, a power and instrument cable 16 and a submersible gearmotor 20, all mounted on a base 18. Submersible gearmotor 20 includes a fluid resistant housing 22 which, in this particular embodiment, is divided into a motor housing 24 and a geartrain housing 26. It should be appreciated by one skilled in the art that housing 22 could also be made from a single unitary piece.

Submersible gearmotor 20 includes a geartrain output shaft 28 which in this particular embodiment is connected to an aerator impeller 30. In operation, aerator impeller 30 is rotated by gearmotor 20 which causes air to flow down air intake pipe 12. The air is then circulated through the liquid medium via impeller 30.

As discussed above, submersible aerators are used in a variety of applications to circulate a gas through a liquid medium. Depending upon a particular application, the speed and torque of the rotating aerator impeller must be carefully controlled depending upon the desired gaseous dispersion. One factor to consider in maintaining a particular impeller speed is the viscosity and density of the surrounding medium. A gearmotor as opposed to a motor provides the ability to vary speed and torque of the output shaft by employing a geartrain with a particular gear ratio.

Figure 2:
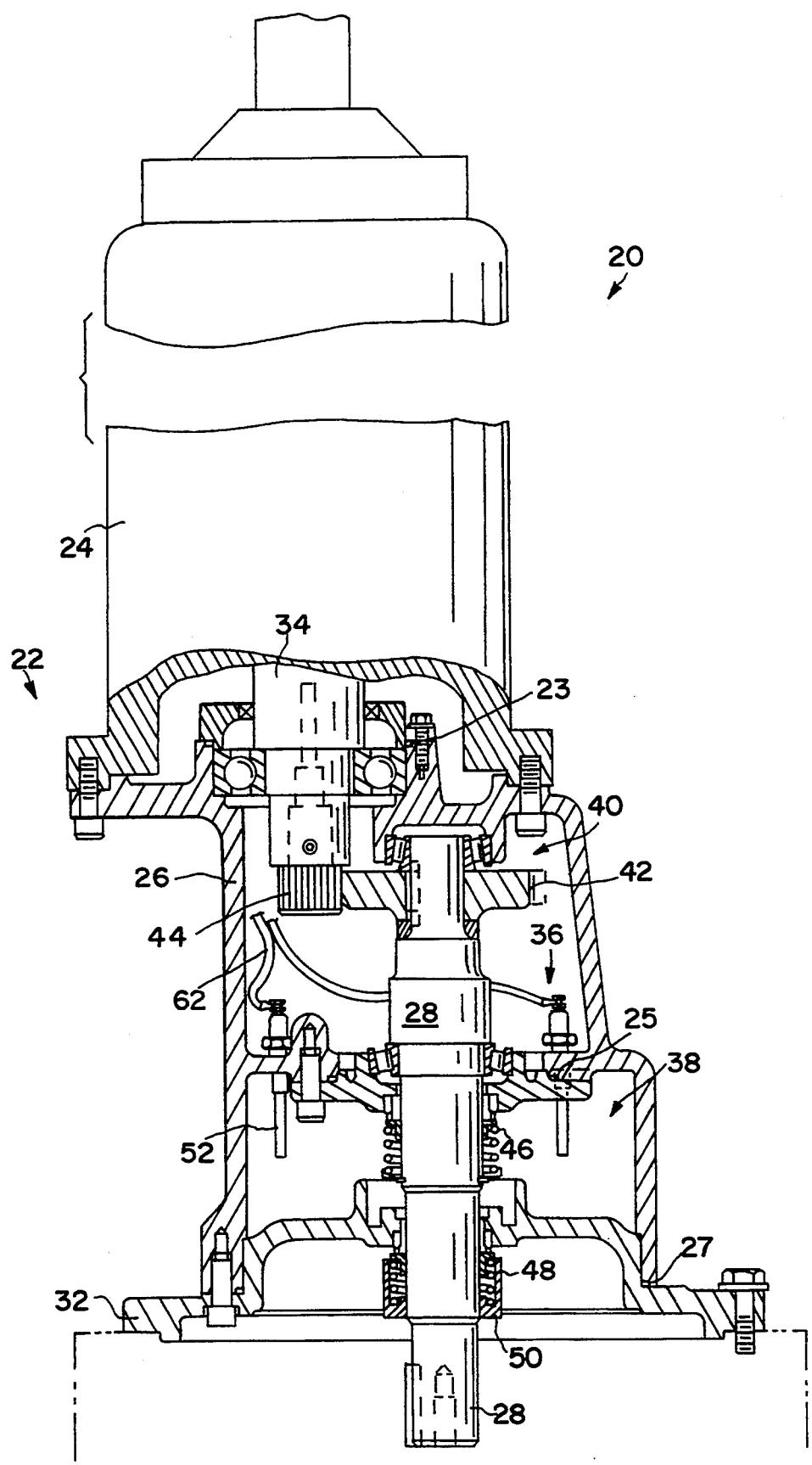
FIG. 2 is a side view with cutaway portions of an embodiment of the submersible gearmotor of the present invention.

FIG. 2 illustrates in detail an embodiment of the submersible gearmotor of the present invention designated generally 20. Similar to submersible aerator 10 in FIG. 1, submersible gearmotor 20 includes housing 22 divided into motor housing 24 and geartrain housing 26. Housing 22 also includes a mounting plate 32 which encloses the output end. Again, housing 22 can be constructed from a plurality of elements or from a single unitary piece. However, regardless of its design, housing 22 must be watertight or liquid resistant in order for the gearmotor to be submersible. When using a plurality of elements to form the housing, preferably O-rings are incorporated into the inner connection of the pieces to ensure liquid resistance. O-rings 23, 25 and 27 as illustrated in FIG. 2 may be constructed from nitrile rubber or any other suitable material as would be apparent to one skilled in the art. Of course, other O-rings could be placed on gearmotor 20 at other locations as long as housing 22 is sealed against the entry of fluids.

Housing 22 is also constructed from a suitable material that will not collapse or disintegrate under operating conditions. In particular, the material should be corrosive resistant to the liquid medium in which it is going to be submerged. For most operations, a housing made from cast iron would be sufficient. Of course, a limitless variety of other materials may be employed including other metals and alloys. Materials that may corrode could also be used if coated with a corrosive resistant film.

Referring to FIG. 2, motor housing 24 contains a motor and portions of a motor shaft 34. Geartrain housing 26, on the other hand, is divided into two separate and adjacent receiving chambers by a pair of radially inwardly extending partitions. A first receiving chamber 36, which may be referred to as a gearbox sump, contains the end of motor shaft 34, a geartrain generally 40 and a portion of geartrain output shaft 28 extending from geartrain 40. In this particular embodiment, geartrain 40 is a reducer and therefore reduces shaft speed and increases shaft torque. However, the present invention not only embodies reducers but also increasers used in conjunction with submersible motors. In FIG. 2, geartrain 40 includes a helical gear 42 and a pinion 44. The gear ratio of helical gear 42 to pinion 44 can be varied to any desirable ratio dependent upon the needed output speed or torque.

Gearbox sump 36 also contains a lubricant for lubricating geartrain 40 or any other moving parts within the chamber. Typically, natural or synthetic gear oils are used as lubricants. The lubricant reduces wear of the gears and also absorbs heat during operations.

Geartrain housing 26 includes a second receiving chamber 38, which may be referred to as a moisture barrier sump, houses a portion of output shaft 28. Moisture barrier sump 38 acts as a protective reservoir separating gearbox sump 36 containing geartrain 40 from the outside liquid environment. Moisture barrier sump 38 can also contain a lubricating oil as will be described below.

Gearmotor 20 also includes a tandem seal arrangement for further protecting the critical components of gearmotor 20 from a liquid environment. Generally, seals are located where housing 22 converges with output shaft 28.

Referring to FIG. 2, the tandem seal arrangement for gearmotor 20 includes an inboard seal 46 and an outboard seal 48. Inboard seal 46 is generally located about the perimeter of output shaft 28 and placed inside moisture barrier sump 38. Outboard seal 48, on the other hand, is located outside of housing 22 about the perimeter of shaft 28. Seals 46 and 48 can include any means that will provide a moisture resistant seal between housing 22 and output shaft 28 without significantly impeding the rotation of shaft 28. One particular embodiment for seals 46 and 48 includes mechanical face seals.

Mechanical face seals are seals constructed to prevent high pressure leakages between flat, rotating surfaces. Conventional mechanical seals typically include a material for abutting the surface of an output shaft, a spring for applying tension to the material and an assembly for holding the seal in place. The seal materials may include many different combinations and constructions of elastomers and face materials. Examples of suitable seals are marketed by the John Crane Company of Morton Grove, Illinois.

Because outboard seal 48 is located outside housing 22, seal 48 is more susceptible to damage from the surrounding environment. Consequently, a seal shroud 50 can be utilized to cover and protect seal 48 depending upon the particular application for gearmotor 20. In particular, shroud 50 protects seal 48 from debris in the surrounding liquid. As used herein, debris refers not only to stringy and fibrous materials which are especially harmful to mechanical face seals, but to any similar type of damaging foreign substance. Shroud 50 may also maintain seal 48 in place during operation of gearmotor 20.

Seals 46 and 48 provide two layers of protection for gearmotor 20. However, because seals 46 and 48 are always in contact with moving parts, they are susceptible to wear and ultimately to failure. Since outboard seal 48 is on the outside of housing 22, it will typically fail before inboard seal 46. If outboard seal 48 does fail, inboard seal 46 continues to safeguard the critical components of gearmotor 20 while water or other foreign matter enters moisture barrier sump 38.

If inboard seal 46 were to fail first, no harm should result to gearmotor 20. The expected consequence would be that the lubricant found in gearbox sump 36 would partially drain into moisture barrier sump 38. However, as stated above, moisture barrier sump 38 can also be filled with a lubricant. The lubricant would lubricate the inboard seal during operation and would also act as a heat sink. Preferably, the lubricant contained in moisture barrier sump 38 would be the same or compatible with the lubricant contained in gearbox sump 36. If inboard seal 46 were to fail, flow of lubricants between chambers 36 and 38 would create no present danger to gearmotor 20.

To account for possible seal failure, submersible gearmotor 20 may further include a seal failure and leak detection system. As illustrated in FIG. 2, a moisture sensing probe 52 extends into moisture barrier sump 38. Although not illustrated in FIG. 2, a second moisture probe also extends into sump 38. The two moisture probes are capable of detecting water or other foreign substances in moisture barrier sump 38. As set forth above, sump 38 can contain a lubricant which is preferably an oil and when utilizing the moisture probes is preferably dielectric. The moisture probes detect any conductive liquid in chamber 38 by monitoring electrical conductivity between them. If the resistance between the two probes decreases, an electrical circuit forms. The formed circuit indicates the presence of moisture and can be designed to trigger an alarm or halt operation of the motor. As used here, moisture refers to any conductive liquid. Detection of moisture in this embodiment would most likely indicate outboard seal failure and therefore the need for preventive maintenance on gearmotor 20.

Figure 3:
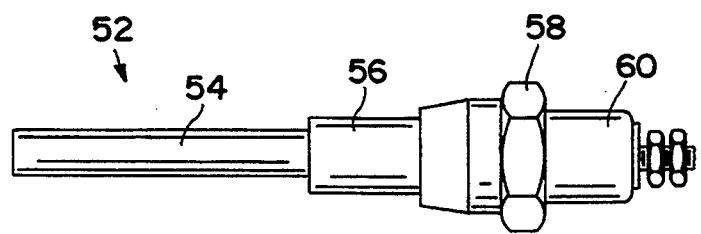
FIG. 3 is a side view of a moisture sensing probe used in the leak detection and seal failure warning system of the submersible gearmotor of the present invention.

An embodiment of moisture sensing probe 52 is illustrated in FIG. 3. Moisture probe 52 includes an electrode 54, a sleeve 56, a bushing 58 and a cap 60. Typically, electrode 54 and bushing 58 are made from stainless steel while sleeve 56 is made from Teflon and cap 60 is made from a ceramic material. An example of a suitable moisture probe is Model No. 3HID003 marketed by Warrick Controls, Inc. of Royal Oak, Mich. However, moisture probe 52, as illustrated in FIG. 3, is merely a preferred embodiment for sensing foreign substances in moisture barrier sump 38. As should be readily apparent to one skilled in the art, the present invention encompasses any suitable means for detecting moisture in chamber 38.

Alternatively, one set of moisture probes can be used to detect moisture in moisture barrier sump 38 and gearbox sump 36. As shown in FIG. 2, a wire 62 is connected to moisture probe 52. If raw wire were exposed at this connection, the raw wire would function similar to electrode 54. Consequently, if a similar connection were present at the same location on an opposing probe, the pair of connections would detect moisture in the manner as explained above. Also as stated above, gearbox sump 36 contains a lubricant which could also be a dielectric oil. One set of moisture sensing probes could therefore detect moisture in sumps 36 and 38 simultaneously.

Also, similar bare wire connections can be placed in motor housing 24 for sensing moisture next to the motor. A dielectric oil is not present in motor housing 24, however. Consequently, the bare wire connections would preferably be located adjacent gearbox sump 36. Normally, gearmotor 20 operates in an upright vertical position as shown in FIG. 1. Moisture or condensation would collect upon the partition separating motor housing 24 from gearbox sump 36 due to gravity. The bare wire connections would be placed upon or near this partition in order to detect moisture when it first enters motor housing 24. If gearmotor 20 were operated in different positions, the optimal placement of the bare wire connections would change depending upon the location where moisture would be likely to first accumulate. As such, one set of moisture probes is capable of sensing moisture in any combination of the following three areas: moisture barrier sump 38, gearbox sump 36 and motor housing 24.

As another alternative embodiment an additional set of moisture probes may be mounted in gearbox sump 36. Two sets of moisture probes would indicate more precisely the location where moisture is leaking in. This second set of moisture probes would monitor changes in electrical conductivity in sump 36. The addition of a second set of probes would indicate the presence of moisture in gearbox sump 36 indicating the possible failure of outboard seal 48 and inboard seal 46. Further, any detection made by this second set of probes would indicate an immediate necessity to halt operation of gearmotor 20 and perform preventive maintenance. Of course, more sets of probes could be installed in gearmotor 20 at many different locations.

Moisture sensing probes 52 as shown in FIG. 2 include wire 62 that preferably is connected to power and instrument cables 16 as shown in FIG. 1. When the motor is in operation, geartrain 40 creates a turbulent environment as it moves through the gear oil. Consequently, wire 62 must be carefully threaded around geartrain 40 and around the motor. It is important that wire 62 does not become disconnected by interfering with the internal workings of gearmotor 20. Preferably, feedthrus are installed which provide passages for wire 62. Feedthrus provide protective canals for wire 62. Preferably feedthrus are located between motor housing 24 and gearbox sump 36. Feedthrus can also assist in providing a location for bare wire connections as described above.

As discussed above, gearmotor 20 can be incorporated into a variety of submersible apparatus. Specifically, output shaft 28 of gearmotor 20 can be used to drive a liquid propulsion device. As used herein, a liquid propulsion device refers to impellers, propellers, a further geartrain, a conveyor system or other similar mechanisms. As used herein, submersible apparatus refers to a submersible aerator, a pump, a mixer, a comminutor, a winch or any other similar device. Also, the present invention encompasses all types and sizes of motors from smaller horsepowers to larger horsepowers. Further, the geartrain can include any desired gear ratio and can include from two to a plurality of gears.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A submersible gearmotor, said submersible gearmotor including:

a motor contained in a motor housing and including a motor shaft extending into a geartrain housing;

a geartrain housing integrally attached to said motor housing, said geartrain housing containing at least one gear and including a geartrain output shaft extending to the exterior of said geartrain housing for operative connection to a device to be driven by said gearmotor, said geartrain housing including at least a first radially inwardly extending partition forming a first output shaft receiving chamber containing a geartrain, and a second radially inwardly extending partition forming a second output shaft receiving chamber adjacent the portion of said geartrain housing through which the output shaft extends; and inner sealing means for sealing between said first inwardly extending partition and said output shaft for preventing moisture from entering said first output shaft receiving chamber and outer sealing means for sealing between said second radially inwardly extending partition and said output shaft for preventing moisture from entering said second output shaft receiving chamber, whereby said gearmotor is sealed against entry of moisture.

2. The submersible gearmotor as defined in claim 1 where said inner sealing means and said outer sealing means include mechanical face seals.

3. The submersible gearmotor as defined in claim 2 where said outer mechanical face seal further includes a seal shroud for holding said seal in place and for protecting said seal from debris.

4. The submersible gearmotor as defined in claim 1 and further comprising a means for sensing moisture in said second output shaft receiving chamber.

5. The submersible gearmotor as defined in claim 4 where said second receiving chamber contains a dielectric oil.

6. The submersible gearmotor as defined in claim 5 where said means for sensing moisture include a pair of moisture sensing probes located within said second receiving chamber and which form an electrical circuit in said dielectric oil when moisture is present.

7. The submersible gearmotor as defined in claim 6 further comprising a second set of moisture sensing probes located within said first receiving chamber for sensing moisture in said first chamber, said first chamber also containing an oil for lubricating said geartrain and for assisting in the operation of said probes.

8. The submersible gearmotor as defined in claim 6 where said pair of moisture sensing probes also sense moisture in said first receiving chamber and said motor housing.

9. The submersible gearmotor as defined in claim 1 where said motor housing and said geartrain housing form a unitary housing for said gearmotor.

10. The submersible gearmotor as defined in claim 1 where said gearmotor is operatively attached to a submersible rotatable apparatus.

11. A submersible gearmotor, said submersible gearmotor including:

a motor contained in a motor housing and including a motor shaft extending into a geartrain housing;

a geartrain housing integrally attached to said motor housing, said geartrain housing containing at least one gear and including a geartrain output shaft extending to the exterior of said geartrain housing for operative connection to a device to be driven by said gearmotor, said geartrain housing including at least a first radially inwardly extending partition forming a first output shaft receiving chamber and a second radially inwardly extending partition forming a second output shaft receiving chamber adjacent the portion of the geartrain housing through which the output shaft extends;

inner sealing means for sealing between said first inwardly extending partition and said output shaft for preventing moisture from entering said first output shaft receiving chamber and outer sealing means for sealing between said second inwardly extending partition and said output shaft for preventing moisture from entering said second output shaft receiving chamber, whereby said gearmotor is sealed against entry of moisture; and means for sensing moisture in said second receiving chamber so as to detect failure of said inner sealing means or said outer sealing means before said gearmotor is damaged.

12. The submersible gearmotor as defined in claim 11 where said inner sealing means and said outer sealing means include mechanical face seals.

13. The submersible gearmotor as defined in claim 12 where said outer mechanical face seal further includes a seal shroud for holding said seal in place and for protecting said seal from debris.

14. The submersible gearmotor as defined in claim 11 where said means for sensing moisture includes a set of moisture sensing probes submersed in a dielectric oil within said second receiving chamber, said moisture sensing probes forming an electrical circuit in said dielectric oil when the resistance between said probes decreases, thereby indicating the presence of a foreign substance.

15. The submersible gearmotor as defined in claim 14 where said set of moisture sensing probes also sense moisture in said first receiving chamber and said motor housing.

16. The submersible gearmotor as defined in claim 14 further comprising a second set of moisture sensing probes submersed in a dielectric oil within said first receiving chamber for sensing moisture in said chamber.

17. The submersible gearmotor as defined in claim 11 where said motor housing and said geartrain housing are unitary.

18. The submersible gearmotor as defined in claim 11 where said gearmotor is operatively attached to a submersible rotatable apparatus.

19. A submersible gearmotor, said submersible gearmotor including:

a motor in a motor housing and including a motor shaft extending into a geartrain housing;

a geartrain housing integrally attached to said motor housing, said geartrain housing containing at least one gear and including a geartrain output shaft extending to the exterior of said geartrain housing for operative connection to a device to be driven by said gearmotor, said geartrain housing including at least a first radially inwardly extending partition forming a first output shaft receiving chamber containing a geartrain, and a second radially inwardly extending partition forming a second output shaft receiving chamber adjacent the portion of said geartrain housing through which the output shaft extends;

an inner mechanical face seal for sealing between said first inwardly extending partition and said output shaft for preventing moisture from entering said first output shaft receiving chamber and an outer mechanical face seal for sealing between said second radially inwardly extending partition and said output shaft for preventing moisture from entering said second output shaft receiving chamber, whereby said gearmotor is sealed against entry of moisture; and moisture sensing probes for detecting the presence of moisture in said second receiving chamber.

20. The submersible gearmotor as defined in claim 19 where said outer mechanical face seal further includes a seal shroud for holding said seal in place and for protecting said seal from debris.

21. The submersible gearmotor as defined in claim 19 where said moisture sensing probes also sense moisture in said first receiving chamber and said motor housing.

22. The submersible gearmotor as defined in claim 19 further comprising a second set of moisture sensing probes submersed in a dielectric oil within said first receiving chamber for sensing moisture in said chamber.

23. A submersible apparatus, said apparatus including:

a gearmotor contained in a housing and including a motor, a motor shaft, a geartrain and a geartrain output shaft, said output shaft extending to the exterior of said housing and operatively connected to a fluid propulsion device, said housing including at least a first radially inwardly extending partition forming a first output shaft receiving chamber, and a second radially inwardly extending partition forming a second output shaft receiving chamber adjacent the portion of said housing through which the output shaft extends;

inner sealing means for sealing between said first inwardly extending partition and said output shaft for preventing moisture from entering said first output shaft receiving chamber and outer sealing means for sealing between said second radially inwardly extending partition and said output shaft for preventing moisture from entering said second output shaft receiving chamber, whereby said gearmotor is sealed against entry of moisture; and means for sensing moisture in said second receiving chamber so as to detect failure of said sealing means before said submersible apparatus is damaged.

24. The submersible apparatus as defined in claim 23 where said inner sealing means and said outer sealing means include mechanical face seals.

25. The submersible apparatus as defined in claim 23 where said outer mechanical face seal further includes a seal shroud for holding said seal in place and for protecting said seal from debris.

26. The submersible apparatus as defined in claim 23 where said means for sensing moisture includes a set of moisture sensing probes submersed in a dielectric oil within said second receiving chamber, said moisture sensing probes forming an electrical circuit in said dielectric oil when the resistance between said probes decreases, thereby indicating the presence of a foreign substance.

27. The submersible apparatus as defined in claim 23 where said set of moisture sensing probes also sense moisture in said first receiving chamber and in said housing in close proximity to said motor.

28. The submersible apparatus as defined in claim 26 further comprising a second set of moisture sensing probes submersed in a dielectric oil within said first receiving chamber for sensing moisture in said chamber.

29. The submersible apparatus as defined in claim 23 where said apparatus is an aerator.

30. The submersible apparatus as defined in claim 23 where said apparatus is a pump.

31. The submersible apparatus as defined in claim 23 where said apparatus is a mixer.

32. The submersible apparatus as defined in claim 23 where said apparatus is a comminutor.

* * * * *